(12) United States Patent
Ward et al.

(10) Patent No.: US 6,773,744 B1
(45) Date of Patent: Aug. 10, 2004

(54) CONFECTIONARY PRODUCTS, LOW FAT CHOCOLATE AND CHOCOLATE-LIKE PRODUCTS AND METHODS FOR MAKING THEM

(75) Inventors: Philip C. Ward, Palmyra, PA (US); Julie A. Emsing, Hershey, PA (US); Beth Anne Ritchey, Cranberry Township, PA (US); Jorge O. Bouzas, Palmyra, PA (US)

(73) Assignee: Hershey Foods Corporation, Hershey, PA (US)

( * ) Notice: Subject to any disclaimer, the term of this patent is extended or adjusted under 35 U.S.C. 154(b) by 317 days.

(21) Appl. No.: 09/985,948

(22) Filed: Nov. 6, 2001

Related U.S. Application Data
(60) Provisional application No. 60/245,578, filed on Nov. 6, 2000.

(51) Int. Cl.$^7$ ................................................. A23G 1/00
(52) U.S. Cl. ....................... 426/659; 426/658; 426/660
(58) Field of Search .......................... 426/548, 658–661

(56) References Cited

U.S. PATENT DOCUMENTS

| | | | |
|---|---|---|---|
| 4,545,997 A | | 10/1985 | Wong et al. |
| 4,664,927 A | * | 5/1987 | Finkel ........................ 426/330 |
| 4,710,393 A | * | 12/1987 | Holmgren et al. .......... 426/330 |
| 5,190,786 A | | 3/1993 | Anderson et al. |
| 5,425,957 A | | 6/1995 | Gaim-Marsoner et al. |
| 5,464,649 A | | 11/1995 | St. John et al. |
| 5,468,509 A | | 11/1995 | Schlup et al. |
| 5,476,678 A | * | 12/1995 | Walter et al. ................ 426/660 |
| H1527 H | * | 4/1996 | Moore ......................... 426/660 |
| 5,505,982 A | | 4/1996 | Krawczyk et al. |
| 5,532,022 A | | 7/1996 | Miller et al. |
| 5,585,135 A | | 12/1996 | Patterson et al. |
| 5,607,716 A | * | 3/1997 | Doherty et al. .............. 426/660 |
| 5,659,000 A | * | 8/1997 | Cain et al. ................... 426/602 |
| 5,849,353 A | | 12/1998 | Baker et al. |
| 5,879,728 A | * | 3/1999 | Graff et al. ...................... 426/5 |
| 6,387,422 B1 | * | 5/2002 | Campbell .................... 426/103 |
| 6,482,465 B1 | * | 11/2002 | Cherukuri et al. .......... 426/660 |
| 2001/0006699 A1 | * | 7/2001 | Bell et al. .................... 426/660 |
| 2001/0036499 A1 | * | 11/2001 | Ong et al. .................... 426/573 |
| 2003/0017202 A1 | * | 1/2003 | Bunick et al. ............... 424/474 |

OTHER PUBLICATIONS

Maurice Jeffery, "Understanding Truffles," Candy Industry, Oct. 1999, p. 48.
Doug Wills, "Water Activity and Its importance in Making Candy," The Manufacturing Confectioner, Aug. 1998, p. 71.
Calorie Control Council, "Fat Replacers: Food Ingredients for Healthy Eating," Mar. 2001.
Lees and Jackson, "Sugar Confectionery and Chocolate Manufacture", 1973, pp. 208–210.
S.T. Beckett, "Industrial Cjocolate Manufacture and Use", 1988 Blackie & Son Ltd., pp. 108–258.
Lees and Jackson, "Sugar Confectionery and Chocolate Manufacture," 1995 Blackie Academic and Professional, pp. 208–210.
Groves 1991 Cast Cream Wafers by the "Bob" Method Candy Industry Nov. 1991, p. 21.

* cited by examiner

*Primary Examiner*—Carolyn Paden
(74) *Attorney, Agent, or Firm*—Wiley, Rein & Fielding, LLP

(57) ABSTRACT

The invention provides, in one aspect, a method of making a confectionery or ingredient or filling for a confectionery, which includes forming a first component by combining water, at least one humectant, corn syrup and sugar; heating the blend to above 170° F.; adding a hydrocolloid or emulsifier; and continuing to heat until a solids content of about 80–90 wt. % is obtained. A second component is formed by combining a fat or fat-containing mixture and a flavoring. The first and second component are then mixed at a temperature above the melting point of the fat to form a mixture. The mixture can then be cooled and formed into finished confectionery, which can be used for retail sale, or processed as an ingredient in a confectionery.

80 Claims, No Drawings

CONFECTIONARY PRODUCTS, LOW FAT CHOCOLATE AND CHOCOLATE-LIKE PRODUCTS AND METHODS FOR MAKING THEM

RELATED APPLICATIONS

This application claims priority benefit from U.S. Provisional application No. 60/245,578, filed Nov. 6, 2000, entitled "Confectionary Product and Process for Making Same."

FIELD OF THE INVENTION AND INTRODUCTION

The invention relates to confectionery products and methods for producing them.

The products and methods of the invention provide numerous advantages. In one example in the chocolate confections field, efforts to reduce fat levels frequently produce undesirable crystallization of components in the final product or the commonly referred to problem of "bloom," where fat or sugar components of the final product migrate to the surface upon storage. By creating a novel combination of processes typically used in sugar confectionery with those typically used in chocolate confectionery, the inventors have surprisingly and advantageously overcome these problems and identified additional advantages. In one aspect, the products and methods of the invention allow those in the art to produce high quality, stable, and/or depositable confectionery ingredients or products. In another aspect, the methods result in products with low water activity, which among other things allows them to be used with wafers and other mixed confectionery ingredients. In general, the products may have various fudge-like textures and flavors, good stability, and an acceptable shelf life of at least six months at room temperature. In another aspect, the products according to the present invention resemble fudge and can be produced with conventional confectionery equipment as stand alone products or as components of molded, enrobed, or panned chocolate confectionery intended for retail sale.

DESCRIPTION OF RELATED ART

Various attempts to produce reduced fat confectionery have been documented. In U.S. Statutory Invention Registration #H1,527 a method for preparing confections with chocolate-like textures and flavors that contain 5–20% total fat is discussed. This method relies on the use of (1) a crystallizable saccharide (greater than 50%) to maintain water activity below about 0.5; and (2) a starch ingredient that is critical to the application. Furthermore, crystallization of the saccharide is induced in a supersaturated syrup through use of a "seeding component" at required mixing temperatures of 220° F. or less. This temperature minimum must be achieved to strike a balance between hydration of added starch, while at the same time not melting the added seed crystals. Because of crystallization in these products, dough-like consistencies are obtained, thereby making extrusion necessary and preventing uses as a depositable or flowable product or ingredient.

U.S. Pat. No. 5,190,786 discusses a chocolate chip-like product with conched flavor, fat-like mouthfeel, thermostability in the oven, and storage stability. The moisture content is 10–20% and water activities (Aw) are 0.8–0.9. This Aw level is above that desired for a product in contact with a wafer and also suggests a tendency for crystallization. The product is made by wet milling regular or defatted cocoa powder with an aqueous sugar syrup in a Dyno-Mill using ceramic beads. The micro-milled cocoa powder is reduced in size from 75 microns to an average of 2–7 microns. Water or skim milk can be used as the liquid medium. The ground paste consists of 10–15% cocoa powder, 55–65% sugar, and 25–35% liquid. After grinding, a dough is formed by mixing 30–50% paste, 45–55% additional powdered sugar, and 5–15% additional cocoa powder. The dough is shaped and cut in a pasta maker with a rotary knife. Another variation of this method, in U.S. Pat. No. 5,344,664, also discusses water activities between 0.8–0.9.

U.S. Pat. No. 5,505,982 discusses a "reverse phase" chocolate in which sucrose is dissolved in water at the boiling point. Corn syrup, lecithin, chocolate liquor, cocoa butter and microcrystalline cellulose (especially coated with surfactant) are then blended using a high-speed mixer. The product is dried under vacuum until the final moisture reaches 3% or less. The product is then cut into pieces to be consumed. Fat contents between 13–27% are alleged. A similar product is discussed that incorporates sweetened condensed milk.

The patent literature also contains examples in the area of incorporating water into chocolate pastes. One area is the addition of pre-made emulsions to chocolate. One example of this approach is U.S. Pat. No. 5,425,957. This patent discusses a method for producing a chocolate-like product containing 2–16% water. Conventional chocolate is blended at temperatures not exceeding 40° C. with a water-in-oil emulsion that also contains an edible emulsifier and a sugar alcohol. The hydrated chocolate is then enrobed with regular chocolate. This process requires a pre-emulsion preparation step, and there is no attempt to control sugar crystallization beyond simple cooling. Enrobing of the hydrated mass with chocolate is required for extended shelf life since crystallization in the final product causes moisture migration and subsequent drying out.

There are also products in which water is simply blended with other ingredients, including gelling agents, to form a creme that is added to chocolate paste. For example, U.S. Pat. No. 5,468,509 discusses a product and process that incorporates from 1–16% moisture into chocolate. Cocoa butter is mixed with cocoa and an emulsifier in order to completely coat the cocoa powder. Also water, sweetener, and milk solids are blended to form an aqueous product. The two mixtures are blended under low shear and the resulting mix is tempered before pouring into molds.

Each of the above methods exhibits one or more process inefficiencies or shortcomings in the characteristics of the final product.

SUMMARY OF THE INVENTION

The present invention relates to a product and its process of manufacture that, in a few aspects, results in a water-continuous matrix that has fudge-like textures and flavors, and/or stable water activities that vary no more than ±0.05, preferably not more than ±0.02, over six months at room temperature. More generally, the invention relates to a novel combination of candy confectionery techniques and chocolate confectionery techniques. The results of this novel combination can be manipulated, as exemplified below, to provide suitable low fat, reduced-fat, flowable, depositable, and/or stable or bloom resistant confectionery products or ingredients.

In one embodiment, the invention provides a method of making a confectionery, such as a bar, or a confectionery used as an ingredient in a product, such as a flowable or depositable filling between layers of wafer or other ingredient, or a confectionery capable of use in enrobing or moulding. The method comprises heating a bob syrup, adding a hydrocolloid to the heated bob syrup, and mixing the bob syrup with added fat component, wherein the amount of hydrocolloid added results in a water activity of the final confectionery of below 0.6, and wherein the final solids content is about 80 to 90% total solids by weight. As known in the art, a bob syrup comprises water, a sugar, and here a humectant, such as a composition of sorbitol and glycerine, or other humectants of the art. Typically, a bob syrup is a mixture of sugars, such as a blend of sugar, corn syrup, and water (see Pancoast, et al. Handbook of Sugars, AVI Publ. Co., $2^{nd}$ Ed. 1980, specifically incorporated herein by reference). One skilled in the art is familiar with the production of a bob syrup and the selection of appropriate ingredients, which may include one or more of high maltose corn syrup, high fructose corn syrup, dextrose, anhydrous dextrose, and sucrose, for example. Any type of suitable humectant can be selected for use and a number have been approved as generally recognized food additives. A humectant functions to absorb and/or promote the retention of moisture in a confectionery. A composition or combination of sorbitol and glycerine is a preferred humectant. However, a sugar alcohol or sugar alcohol-containing composition can be selected. In a preferred example, a carrageenen is added as the hydrocolloid. A hydrocolloid is a water-soluble compound, typically a polymer such as a polysaccharide or protein, that functions to improve the mouthfeel, pourability, encapsulates flavors, builds viscosity, causes gelation, retains moisture, provides elasticity and/or provides freeze-thaw stability to a confectionery. Many other suitable carrageenen examples are known in the art and can be selected and many other hydrocolloids can be selected, such as one or more of hydroxypropyl methylcellulose, gelatin, gum arabic, carboxymethyl cellulose, methyl cellulose, hydroxypropyl cellulose, locust bean gum, guar gum, pectin, xanthan, starch, maltodextrin, gum ghatti, gum karaya, gum tragacanth, dextran, konjac flour, aribinogalactan, gellan gum, agar-agar, furcellaran, and alginate. U.S. Pat. No. 5,607,716, specifically incorporated herein by reference, can be used for selecting one or more hydrocolloids and using them in this invention. An emulsifier, or a combination of emulsifiers, can also be added to or substituted for the hydrocolloid in the confectionery. An emulsifier typically has lipophillic and hydrophilic properties. It is a compound that functions to stabilize the mixture of components in a confectionery. Various examples are known in the art and can be selected for inclusion of substitution for the hydrocolloid here. Particular examples include lecithin, hydroxylated lecithin, fractionated lecithin, and products such as Danisco Dimodan PVK (Degussa; or Cultor Food Science), other Dimodan products, a distilled monogylcerides, Grindsted PGE-55 (polyglycerol esters), and hydroxylated lecithins, such as Metarin® P, Metarin® F, and Precept® 8120. An emulsifier functions to prevents oil migration and bloom in the final product.

Preferably the component containing fat comprises one or more of milk powder, cocoa powder, milkfat, vegetable fat, reduced fat cocoa powder, cocoa butter alternative, such as cocoa butter equivalents (CBEs), cocoa butter improvers (CBIs), cocoa butter substitutes (CBSs), cocoa butter replacers (CBRs), and cocoa butter. Alternatively, a mixture of various fats, modified fats, or fat replacer or food additives and can be selected for the fat containing component. Preferred examples below contain cocoa powder, cocoa butter, chocolate liquor, or cocoa butter alternatives, but many other types of fat containing components, such as those containing peanut butter or white chocolate, can be selected. Low fat, reduced fat, fat substitutes, sucrose polyesters, or low calorie compositions can also be used in the fat containing component. U.S. Pat. Nos. 5,464,649 and 5,849,353, specifically incorporated herein by reference, describe low fat and low calorie compositions that are suitable for use here. However, many other fat containing components can be selected for use. In other examples, the component containing fat comprises one or more of dark chocolate, milk chocolate, bittersweet chocolate, semisweet chocolate, a reduced calorie fat, fat substitute, or fat replacer (protein-based fat replacer, carbohydrate-based fat replacer, or fat-based fat replacer), including examples such as Salatrim (i.e. Benefat®; Cultor Food Science), Simplesse®, Dur-Lo®, EC™-25, or Olestra (Olean®; Procter & Gamble) (see also http://www.caloriecontrol.org/fatrepl.html). The component containing fat may further comprise protein or other food additives, colors, flavorings, or preservatives (see, for example, U.S. Pat. 5,585,135, specifically incorporated herein by reference). The fat content of the final confectionery is preferably between about 10 to about 15% by weight. In preferred examples, the fat content of the final confectionery is between about 5 to about 40% by weight, or about 5 to about 10%, or about 5 to about 7%, or about 10 to about 15%, or about 10 to about 12%, or about 15 to about 30%, or about 20 to about 40%.

In one aspect, the confectionery of the invention, and the products of the inventive methods, displays a water activity of the final confectionery between about 0.4 and 0.6 and preferably a water activity of below 0.6. As noted above, the water activity preferably does not vary by more than ±0.02 over six months at room temperature (RT), or ±0.05, or 0.04, or 0.03, or 0.01 units, as measured by conventional dew point or other methods. Furthermore, the confectionery is stable at room temperature storage for at least six months and/or is resistant to bloom or crystallization for at least six months, or at least 7 months, or 8 months, or 10 months, or 12 months. In another embodiment, the moisture content of the final confectionery is between about 5 to about 15% by weight, or between about 5 to about 10%, or between about 7 to about 12%, or between about 10 to about 15%. Alternatively, the moisture content of the heated bob syrup is between about 5 to about 25% by weight, or between about 10 to about 15%, or between about 15 to about 20%, or between about 15 to about 25%, or between about 20 to about 25%.

In another more particular aspect of the above method, the invention comprises a method of making a confectionery comprising: forming a first component by combining water, at least one humectant, sugar, and at least one corn syrup to form a bob syrup mixture; heating the mixture to above 170° F.; adding a hydrocolloid to the heated mixture; and continuing to heat the mixture until a solids content of about 80–90 wt. % is obtained. The method further comprises forming a second component by combining a fat and a flavoring and mixing the first component and the second component at a temperature above the melting point of the fat to form a mixture. The resulting confectionery can be cooled and used in slab form or used to enrobe, fill a mould, be deposited between layers, or used in other ways. Typically, the first component and the second component are mixed at or nearly at a 50:50 ratio, however other ratios are possible, including 40:60, 60:40, 25:75, 75:25, 48:52, 52:48, 45:55, 55:45. In another aspect, the second component comprises about 1–40 wt. % of the fat, or 1–30%, or 1–20%, or 10–30%, or 20–40%, or 30–40%. As above, the hydrocolloid can be selected from any available or suitable source. Non-limiting examples include hydroxypropyl methylcellulose, gelatin, carrageenen, gum arabic, carboxymethyl cellulose, methyl cellulose, hydroxypropyl cellulose, locust bean gum, guar gum, pectin, xanthan, starch, maltodextrin, gum ghatti, gum karaya, gum tragacanth, dextran, konjac flour, aribinogalactan, gellan gum, agar-agar, furcellaran, and alginate. The humectant is preferably a mixture of sorbitol and glycerine. Humectants can also be selected from compounds or compositions generally referred to as sugar alcohols, such as one or more of glycerol, sorbitol, mannitol, xylitol, maltitol, hydrogenated starch hydrolysate, lactitol, isomalt, and erythritol. In particular embodiments, the second component can be milled to an average particle size below 50 microns prior to the mixing step. In other particular embodiments, the fat selected for use is one or more of animal fat, vegetable fat, milkfat, a modified fat, a fat replacer, Salatrim, Olestra, cocoa butter, cocoa powder, reduced-fat cocoa powder, or cocoa butter alternatives (CBEs, CBIs, CBSs, CBRs). In addition, the second component may comprise at least one of dark chocolate, milk chocolate, bittersweet chocolate, semisweet chocolate, white chocolate, chocolate liquor, or peanut butter. Also, the second component may further comprise a protein, such as a milk protein or soy protein at actual fat contents that are typically below 15 wt. %.

In an optional embodiment for each of the methods and products above, the invention encompasses adding calcium to result in a nutritive calcium chew-type product. Various types of acceptable calcium can be selected for use, including dairy calcium, such as Kelatron, and Fieldgate products, calcium carbonate, and calcium lactate, for example. Other examples of calcium products to add include one or more of calcium citrate-malate, calcium gluconate, calcium citrate, Xtra-Cal®, Lactoval®, Bio Lacta Cal®, tricalcium phosphate, dicalcium phosphate, calcium glutarate, calcium glycerol phosphate. Typically, the calcium is added to the bob syrup, although other variations can be employed. Preferably, calcium to at least 10 wt. % of the final finished product can be selected. Alternatively, a final product with calcium carbonate at about 1 to about 10 wt. %, or calcium carbonate at about 5 to about 7 wt. %, or calcium carbonate at about 6 to about 9 wt. %, or calcium carbonate at about 6.7 wt. % can be selected.

In another aspect of the invention, the methods can be employed to produce a fudge or fudge-like confectionery. Lees & Jackson, *Sugar Confectionery and Chocolate Manufacture*. Routledge (1994), or Jackson (ed.) *Sugar Confectionery Manufacture*. Routledge (1995), each specifically incorporated herein by reference, describe fudge as containing two phases, liquid and solid. The liquid phase is aqueous-based with dissolved sugars. The solid phase is mainly composed of sucrose crystals, which act as nuclei for extended graining and crystal growth after production.

Fudge is a sugar confectionery product that uniquely demonstrates "short" textures with very good flavor release and a pleasant melt-in-the-mouth sensation that can closely mimic that of chocolate and chocolate-like products. Short textures means that the product can be broken into pieces without stringing. Another advantage of fudge is the water-continuous nature of the product that lends itself well to resisting meltdown and fat bloom at elevated temperatures (e.g., 75–95° F.). It also provides a matrix that will allow rich fat-like textures (such as those of chocolate or peanut butter in the 30–50 wt. % total fat range) at actual fat contents that are typically below 15 wt. %.

Very fine crystals in fresh fudge and fondants are known to exhibit fat-like textures and good flavor release, but also limit shelf life due to increasing water activity (increasing unbound water) in the matrix as resultant sugar crystallization proceeds. As a result, water molecules eventually migrate to the surface and evaporate. This results in dry, unacceptable products within a few weeks or months even under the best of storage conditions. Water activity changes over time in storage and also restricts shelf life of other low water activity components or inclusions that are present (e.g., wafers, cookies, and the like). Since moisture will migrate from regions of high to low water activity, these inclusions can get soggy and become unappealing when consumed. In addition, the movement of moisture to the product surface can result in sugar bloom and dullness of surface gloss. For the significance of water activity in candy manufacturing, see Wills, "Water Activity and its Importance in Making Candy," *The Manufacturing Confectioner*, 71 (August 1998), specifically incorporated herein by reference.

According to the present invention, confectionery products can be produced having a water activity less than 0.6, or preferably in the range of about 0.4 to about 0.6. The non-crystallizing matrix with stable water activity not only prevents drying out, but also allows the use of inclusions with similar water activities for use in multi-component products. According to the knowledge in the art, a combination of a bob syrup and a fat containing component and/or chocolate and fat containing component as formulated and processed herein would result in a product that predictably crystallizes and/or has a significantly increasing water activity over a period of several days. This is due to a high level of sucrose and other sugar crystals or nuclei in the liquid phase such that it is saturated upon cooling. Sugar crystals are present as a result of excess crystalline sugar in the formula and/or mechanical shearing to produce crystal nuclei. This crystallization is often used to produce certain textures in confectionery manufacture but can shorten shelf-life when not under control. In fact, during fudge making, sugar crystallization can continue for weeks resulting in products that are unpalatable since levels get too high. (See, for example, Lees & Jackson, Sugar Confectionery and Sugar Manufacturer, 1973, p. 208). The success in preparing low water activity confectionery demonstrated here is therefore both surprising and novel.

Without limiting the invention to any particular explanation of how and why it works and provides advantages, the inventors believe that the confectionery products of the present invention contain a continuous aqueous base. The fudge-like textures and flavors are believed to be a result of a continuous, non-crystallizing aqueous phase, which somehow mimics fresh fudge attributes without the disadvantage of further crystallization over time. The products have the advantage of being significantly reduced in fat (for example by at least 50%) over similar textured full-fat chocolate confectionery. Also, through the use of reduced calorie bulking agents, modified fats, and sugar alcohols, significant calorie reduction can be achieved compared to conventional confectionery products, while maintaining high eating quality of the resulting confectionery.

Throughout this disclosure, applicants refer to journal articles, patent documents, published references, web pages, and other sources of information. One skilled in the art can use the entire contents of any of the cited sources of information to make and use aspects of this invention. Each and every cited source of information is specifically incorporated herein by reference in its entirety. Portions of these sources may be included in this document as allowed or required. However, the meaning of any term or phrase specifically defined or explained in this disclosure shall not be modified by the content of any of the sources. The description and examples that follow are merely exemplary of the scope of this invention and content of this disclosure and do not limit the scope of the invention. In fact, one skilled in the art can devise and construct numerous modifications to the examples listed below without departing from the scope of this invention.

DETAILED DESCRIPTION OF EXEMPLARY EMBODIMENTS

As noted above, in one aspect the confectionery products according to the invention are produced by blending two components: (I) a bob syrup which is boiled to a specific solids content; and (II) a fat-containing component which is blended into the bob syrup after the cook. Use of this formulation has been found surprisingly to achieve a controlled and advantageous water activity. A bob syrup as used in this invention is a water, sugar, humectant blend, typically also containing corn syrup and sugar alcohol, that may be cooked down to a specific solids content.

The non-crystallizing nature of the product offers several advantages. The formula does not require a "seeding" agent, which also eliminates the need for cooling of the bob syrup before addition of the fat-containing component. The inhibition of uncontrolled crystallization may be critical in maintaining a stable water activity for extended shelf life. It is believed the resulting product achieves fudge-like textures in the absence of any significant sugar crystallization as a result of the ratio and composition of the two components in combination with the use of hydrocolloids of specific functionality.

Further, the processing is flexible and does not require specialized equipment. Once the bob syrup reaches a final solids content, the fat-containing component is mixed in immediately with low shear mixing, which helps aid in the cooling of the product overall. There are no requirements for high speed mixing, pressure treatment, or specialized cooling steps, which simplifies the process and maximizes economic efficiency.

The addition of hydrocolloids to the formula can enhance the process flexibility even further. Any suitable hydrocolloid may be used, for example, hydroxypropyl methylcellulose, gelatin, a carrageenan or carrageenan fraction, gum arabic, carboxymethyl cellulose, methyl cellulose, hydroxypropyl cellulose, locust bean gum, guar gum, pectin (low and high methoxy), xanthan, starch, maltodextrin, gum ghatti, gum karaya, gum tragacanth, dextran, konjac flour, aribinogalactan, gellan gum, agar-agar, furcellaran, alginate, soy, peanut, milk proteins, and the like. Various food additives manufacturers provide hydrocolloids and examples and catalogues can be selected on the internet. Particularly good results are achieved with hydroxypropyl methylcellulose, which is commercially available as MethoCel F50®. Hydroxypropyl methylcellulose can be added to the supersaturated syrup above 170° F., which allows for efficient cooking and downline processing such as slabbing, molding or drop depositing on conventional equipment. Because viscosity increases are avoided until the product cools to below process temperatures, the blended components can be processed easily on standard sugar confectionery equipment as described above. Alternatively, other hydrocolloids such as carrageenen can be added to enhance syrup viscosities to allow for extrusion or control of cold flow and to modify textures in the final confectionery product. Product temperature may also be lowered to enable extrusion processing without crystallization.

If necessary, the hydrocolloid may be pretreated to retard the rate of hydration. Such methods include dry-blending a hydrocolloid powder with another dry powder (e.g., sugar) at a ratio of about 1 part hydrocolloid to about 3 parts dry powder. The dry blend is slowly added to the water or liquid mixture. Alternatively, the hydrocolloid may be pre-blended into an oil or into a high viscosity fluid (e.g., liquid sugar or high fructose corn syrup). The hydrocolloid may also be added directly to water in which a vortex has been established with a high shear mixer. In addition, the hydrocolloid may be added to water using a centrifugal pump (e.g., tri-blender) or a spray nozzle.

Component I is prepared as a high solids water continuous phase produced by combining (1) water; (2) at least one sugar alcohol or humectant; (3) sugar; and (4) at least one corn syrup. In addition, salt and/or an emulsifier (e.g., a mono- or diglyceride) may be added. These ingredients are heated to above 170° F. Then, a hydrocolloid is added. This entire mixture is then heated until desired final solids content is obtained. The finals solids content is about 80–90 wt. % solids.

Useful humectants include one or more of, but are not limited to, sugar alcohols, glycerol or glycerine, sorbitol, mannitol, xylitol, maltitol, hydrogenated starch hydrolysate, lactitol, isomalt, erythritol, and the like and any combination of these. Any suitable corn syrup may be used. Examples include 42 high maltose or 42 dextrose equivalent (acid- and/or enzyme-converted). However, the corn syrup is not limited to these compounds. It is believed that the hydrocolloid inhibits crystallization. Preferably, the hydrocolloid is hydroxypropyl methylcellulose, such as MethoCel F50®. However, the hydrocolloid may also be gelatin, agar, or carrageenan, thereby resulting in a more chewy texture than that achieved using hydroxypropyl methylcellulose. The formula for Component I is not restricted to the above ingredients. Sugar alcohols, nutritive and non-nutritive carbohydrate sweeteners, bulking agents, inulin, polydextrose, maltodextrins, emulsifiers, and corn syrup solids can be used interchangeably in the formula at properly specified levels.

Component II is comprised of a fat and a flavoring and typically does not contain water. The fat includes, but is not limited to, animal and vegetable fats; cocoa butter; and cocoa butter alternatives (e.g. cocoa butter equivalents, cocoa butter improvers, cocoa butter substitutes, cocoa butter replacers). It is also possible to use substances that contain fat, such as dark chocolate; milk chocolate; bittersweet chocolate; semisweet chocolate; and peanut butter. The fat also includes reduced calorie fats and rat replacers, for example Salatrim (BENEFAT®). In preferred embodiments, the fat has a low melting point, e.g., around body temperature. Particularly preferably; the fat is cocoa butter and is present in an amount of about 1–40 wt. % of the component. The flavoring may be any flavoring, preferably in powder form. Suitable flavorings include, but are not limited to, cocoa powder, fruit, nut, and vanilla flavorings. One skilled in the art is familiar with numerous flavoring examples than can be selected for use consistent with this invention.

Examples of fat containing components that can be selected include those previously used as low fat or reduced fat chocolate or confectionery. For example, U.S. Pat. No. 5,532,022 (incorporated herein by reference) discusses the preparation of an aqueous gel matrix that replaces the fat component of chocolate and similar confectionery products, yielding products with less than 15% total fat and having a firmness similar to full fat chocolate. The product is prepared by heating a mixture of maltodextrin, sugar, and water to 180–200° F. and holding the mixture at this temperature for 10–30 minutes. Flavor particles below 50 microns are added and the mixture is cooled. The moisture levels are between 30–60% of the final product. The final product is soft and butter-like above 32° F. It requires some freezing of water for firm textures to occur, and it is recommended for use in frozen desserts. Other specific examples include those from U.S. Pat. Nos. 5,849,353 and 5,464,649, each incorporated herein by reference.

Sugar, protein, and/or an emulsifier (e.g., lecithin, glycerol monostearate (GMS)) may also be added to Component II. Preferred protein sources are milk, for example caseinates, hydrolyzed caseinates, total milk proteins (TMPs), and whey protein concentrates (WPCs), or soy, but other sources of protein can be used. Carbohydrate sweeteners can be any nutritive or non-nutritive carbohydrate sweetener added at levels that will not allow crystallization in the final product when stored at room temperature for at least six months. Component II can also be in the form of standardized chocolate or confectionery peanut butter, as well as other confectionery products.

It is possible and may be recommended, under certain circumstances, to mill Component II to an average particle size below 50 microns so that any non-dissolving particulates are assured of providing final desired product textures that are smooth and not detectable in the mouth.

Component I is combined with Component II in a gentle mixing motion at elevated temperatures above at least the melting point of the fat. Preferred temperatures range from 200–260° C., or more preferably 240–250. The ratio of Component I to Component II should be about 40:60 to 60:40 and preferably about 48:52 to 52:48 or 50:50. Other ratios can be used. The mixture is then slabbed, cut into pieces, and cooled. Alternatively, the mixture can be used to enrobe or coat other inclusions or ingredients in a final product or fill layers between inclusions or ingredients. Methods for enrobing, coating, and filling are known in the art and include those of U.S. Pat. No. 4,545,997.

EXAMPLES

Example 1

Component I contains 89.18 grams of water, 133.76 grams of sugar (sucrose), 156.06 grams of 42 high maltose corn syrup, 40.13 grams of sorbitol 70, 75.24 grams of glycerol, 3.51 grams of salt and 0.50 grams of glycerol monostearate (i.e., Myvaplex 600K). Under constant agitation, the mixture was heated to 170° F. 1.62 grams of hydroxypropyl methylcellulose (MethoCel® F50) were then added to the mixture while stirring. The mixture was then heated to about 260° F. under constant agitation and cooked to achieve 85 wt. % solids. The mixture was removed from the heat source.

Component II contains 465.7 grams of sucrose, 276.9 grams of chocolate liquor, 60.7 grams of cocoa powder, 0.3 grams of vanillin, 60 grams of anhydrous milk fat, 4 grams of lecithin, and 132.4 grams of cocoa butter.

Component I was blended with Component II in a 50:50 ratio. The combined mixture was mixed thoroughly at a temperature of about 240–250° F. The combined blend was then slabbed and cooled to room temperature. The slab was cut into the desired size and shape and packaged for storage at about 65–70° F.

Example 2

Component I contains 76.5 grams of water, 179.22 grams of sugar, 49.42 grams of 42 dextrose equivalent (acid converted) corn syrup, 30.08 grams of sorbitol, 60.17 grams of glycerol, 2.41 grams of salt, 0.73 grams of glycerol monostearate (Myvaplex 600K), and 100.27 grams of High Fructose Corn Syrup 55. Under constant agitation, the mixture is heated to 170° F. 1.20 grams of hydroxypropyl methylcellulose (MethoCel® F50) were then added to the mixture while stirring. The mixture was heated to about 260° F. under constant agitation and cooked to achieve about 85 wt. % solids. The mixture was removed from the heat source.

Component II contains melted vanilla chips, commercially available from Hershey Foods Corporation.

Component I and component II were blended in a 50:50 ratio. The combined mixture was mixed thoroughly at a temperature of about 240–250° F. The combined blend was when slabbed and cooled to room temperature.

Example 3

Gel capable of deposition and filling uses: Component I contains 79.58 grams of water, 156.47 grams of sugar, 60.35 grams of 42 dextrose equivalent (acid converted) corn syrup, 31.29 grams of sorbitol, 62.59 grams of glycerol, 2.55 grams of salt, 0.76 grams of glycerol monostearate (Myvaplex 600K), and 105.06 grams of High fructose Corn Syrup 55. Under constant agitation, the mixture is heated to 170° F. 1.34 grams of hydroxypropyl methylcellulose (MethoCel® F50) were then added to the mixture while stirring. The mixture was then heated to about 260° F. under constant agitation and cooked to achieve about 85 wt. % solids. The mixture was removed from the heat source.

Component II contains dark chocolate formulated with 6 wt. % anhydrous milk fat.

Component I and component II were blended in a 50:50 ratio. The combined mixture was mixed thoroughly at a temperature of about 240–250° F. The combined blend was when slabbed and cooled to room temperature. The water activity of the resultant product was about 0.45.

Example 4

Component I contains 76.48 grams of water, 179.17 grams of sugar, 49.41 grams of 42 dextrose equivalent/acid converted corn syrup, 30.08 grams of sorbitol, 60.15 grams of glycerol, 2.45 grams of salt, 0.73 grams of glycerol monostearate (Myvaplex 600K), and 100.24 grams of High Fructose Corn Syrup 55. Under constant agitation, the mixture was heated to 170° F. 1.29 grams of hydroxypropyl methylcellulose (MethoCel® F50) was then added to the mixture while stirring. The mixture was then heated to 261.2° F. under constant agitation and cooked to achieve 86–86.5 wt. % solids. The mixture was removed from the heat source.

Component II contains a layer of melted peanut butter chips on a layer of melted butterscotch chips.

Component I and Component II were blended in a 50:50 ratio at a temperature of about 240–250° F. The combined blend was slabbed and cooled to room temperature. The water activity of the resultant product was about 0.410 at 23.2° C.

Example 5

Component I is the same as in Example IV, with about 3 additional grams of glycerol. Component I is cooked at about 258.5° F. to obtain about 85–85.5 wt. % solids. Component II contains a layer of melted white chocolate chips on a layer of melted dark chocolate.

Component I and Component II were blended in a 50:50 ratio at a temperature of about 240–250° F. The combined blend was then slabbed and cooled to room temperature. The water activity of the resultant product was about 0.420 at 22.9° C.

Example 6

Component I contains 152.96 grams of water, 358.34 grams of sugar, 200.48 grams of high fructose corn syrup 55, 98.82 grams of 42 dextrose equivalent (acid converted) corn syrup, 60.15 grams of sorbitol 70, 120.31 grams of glycerol, 4.90 grams of salt and 1.46 grams of glycerol monostearate (i.e., Myvaplex 600K). Under constant agitation, the mixture was heated to 170° F. 2.58 grams of hydroxypropyl methylcellulose (MethoCel® F50) were then added to the mixture while stirring. The mixture was then heated to about 260° F. under constant agitation and cooked to achieve about 85 wt. % solids. The mixture was removed from the heat source.

Component II contains 465.7 grams of sucrose, 276.9 grams of chocolate liquor, 60.7 grams of cocoa powder, 0.3 grams of vanillin, 60 grams of anhydrous milk fat, 4 grams of lecithin, and 132.4 grams of coca butter.

Component I was blended with Component II in a 50:50 ratio. The combined mixture was mixed thoroughly at a temperature of about 240–250° F. The combined blend was then slabbed and cooled to room temperature. The shelf life of the resultant confectionery product was at least 12 months.

Example 7

Comparison of Humectant, Emulsifier and Hydrocolloid Ingredients: Component I contains 89.19 grams of water, 133.76 grams of sugar, 156.06 grams of high maltose corn syrup, 40.13 grams of sorbitol, 75.24 grams of glycerine, 3.51 grams of salt and 0.5 grams of glycerol monostearate (i.e., Myvaplex 600K). Under constant agitation, the mixture is heated to 170° F. Then 1.62 grams of hydroxypropyl methylcellulose (MethoCel® F50) is added to the mixture while stirring. The mixture is then heated to about 260° F. under constant agitation and cooked to achieve about 85 wt. % solids. The mixture was removed from heat.

Component II, for a dark chocolate variation of the invention, contains 465.7 grams of sucrose, 276.9 grams of chocolate liquor, 60.7 grams of cocoa powder, 0.3 grams of vanillin, 60 grams of anhydrous milk fat, 4 grams of lecithin, and 132.4 grams of coca butter.

Component I was blended with Component II in a 50:50 ratio heated to about 240–250° F. until about 87.5% solids, or between 80–90% solids content. Samples where humectant (here sorbitol and glycerine) are omitted and samples where hydrocolloid (here MethoCel®) are omitted are made the same way—cooked to about 85–87.5% solids at about 245° F. Samples are tested for water activity Aw using conventional dew point calculations. For confectionery with humectant the Aw is about 0.453 at 22.3° C. at 24 hours and 0.619 for samples with humectant omitted. After 7–10 days room temperature storage the Aw with humectant is about 0.436 at 22.7° C. and with humectant omitted about 0.609 at 22.2° C. Another set of samples resulted in a no humectant Aw of about 0.585 at 23.0° C. initially and Aw of about 0.573 at 23.6° C. after 7 days storage at room temperature. The texture of the samples appears similar but the sample with no humectant is softer.

Samples are also prepared with dark chocolate component II and different hydrocolloids, such as MethoCel®, hydroxypropyl methylcellulose, agar-agar (Key D), carrageenan SeaKem® CM611, kappa-carrageenan Gelcarin GP911, and emulsifiers, such as Precept® 8120, Metarin®F&P, or Danisco Dimodan PVK. In each case, hydrocolloids or emulsifiers prevent bloom in comparison to samples where these ingredients are omitted. The product's texture is good and flavor is good. Samples prepared without MethoCel® or hydrocolloid or emulsifier, after two months storage at room temperature, show visible fat bloom on the surface and a dry, crumbly texture. The results of Aw testing in conventional dew point analysis at temperature about 23–24° C. after 7 days storage range from 0.442 to 0.469, and at 1 month storage from 0.438 to 0.464, using the different hydrocolloids or emulsifiers noted above.

Example 8

Aerated confectionery: Component I is made to contain 267.6 grams water, 4.8 grams MethoCel®, 401.25 grams sugar, 1.5 grams Myvaplex®, 468.15 grams high maltose corn syrup, 10.5 grams salt, 120.45 grams sorbitol, and 225.75 grams glycerine. Component I is mixed with a component II, as dark chocolate variation above. Emulsifier and Presswhip step used to optimize aeration. Presswhip is used as conventionally, such as 3 minutes at 3 Bar with pre-warmed equipment. Propylene glycol esters of fatty acids (PGE; PGE-55) and Dimodan (Danisco Dimodan PVK; or other distilled monoglyceride), for example, can be selected as emulsifiers. Density ranges between about 0.48 (1.2% total emulsifier) and 0.93 (3.13% total emulsifier) can result by selecting appropriate emulsifier content under these conditions. For example, a total emulsifier content of 5% leads to a product with density of about 0.7. Optionally, inclusions can be added to the product, as one skilled in the art is aware of numerous appropriate inclusions for confectionery products.

Example 9

Low fat chocolate: Component II in above examples can be used with Salatrim (BENEFAT®), Olestra (OLEAN®), or other modified fat or fat replacer additive or ingredient noted here or available, to reduce the digestible fat content of confectionery. Component II will typically contain reduced fat cocoa or fat free cocoa if a chocolate or chocolate-like product is desired. As above, component I is mixed and heated to above 170 F. MethoCel® or other selected hydrocolloid is added after the temperature reaches 170 F. Cook to approximately 85% solids at approximately 260 C. Emulsifier, such as Metarin® P or F is added to approximately 1.3% and then mixed with the low fat chocolate component II. Mixture can also be presswhipped, as above. Total fat content of this product is approximately 17.91%, without Presswhip, and selecting combinations of fat and modified fat substitutes, such as Salatrim, can reduce total fat levels and/or total digestible fat on the nutrition panel to about 15% and preferably between about 5 to about 15%.

Example 10

Calcium additive: Component I is made with 89.2 grams water, 1.16 grams MethoCel®, 128.75 grams sugar, 151.05 grams high maltose corn syrup, 0.5 grams Myvaplex® 600, 3.5 grams salt, 40.15 grams sorbitol, 75.25 grams glycerine, and a calcium, such as 10 grams Kelatron or a percentage of calcium as shown below. Calcium, such as any dietary or edible calcium like dairy calcium or calcium carbonate, can be selected for use. Here, samples with Kelatron Bio-LactaCal® (10 grams or 30% calcium), Lactoval milk minerals (19 grams or 17% calcium), and Fieldgate Natural Dairy Calcium 1000 (12 grams or 25% calcium) are exemplified. As evaluated by an internal sensory panel, all products cited above with calcium addition were similar to the control and acceptable for texture. There were no detectable off-notes or undesirable gritty textures that are sometimes associated with calcium supplementation in this type of product.

What is claimed is:

1. A method of making a confectionery, comprising: heating a syrup comprising water, a sugar, and a humectant; adding a component containing fat to the heated syrup; adding a hydrocolloid to the heated syrup; and mixing the syrup with added fat component and hydrocolloid, wherein the amount of hydrocolloid added results in a water activity of the final confectionery of below 0.6, and wherein the final solids content is about 80 to 90% total solids by weight.

2. The method of claim 1, wherein carrageenan is added as the hydrocolloid.

3. The method of claim 1, wherein the component containing fat comprises one or more of milk powder, milkfat, reduced-fat cocoa powder, a fat replacer, cocoa powder, vegetable fat, cocoa butter alternative, and cocoa butter.

4. The method of claim 3, wherein the component comprising fat comprises cocoa butter.

5. The method of claim 1, wherein the humectant comprises glycerol and sorbitol.

6. The method of claim 1, wherein the component containing fat comprises one or more of dark chocolate, milk chocolate, bittersweet chocolate, semisweet chocolate, white chocolate, chocolate liquor, and peanut butter.

7. The method of claim 1, wherein the component containing fat further comprises protein.

8. The method of claim 1, wherein the water activity of the final confectionery is between 0.4 and 0.6.

9. The method of claim 1, wherein the moisture content of the final confectionery is between about 5 to about 15% by weight.

10. The method of claim 1, wherein the moisture content of the heated syrup is between about 10 to about 25% by weight.

11. The method of claim 1, wherein the fat content of the final confectionery is between about 10 to about 15% by weight.

12. The method of claim 1, wherein the fat content of the final confectionery is between about 5 to about 40% by weight.

13. The method of claim 1, wherein the fat content of the final confectionery is between about 5 to about 7% by weight.

14. The method of claim 1, further comprising adding calcium.

15. The method of claim 14, wherein the calcium is in the form of calcium carbonate.

16. The method of claim 15, wherein calcium carbonate is added to result in a final concentration of about 1 to about 10% by weight.

17. The method of claim 16, wherein the final concentration of calcium carbonate is about 5 to about 8% by weight.

18. The method of claim 1, wherein the hydrocolloid is one or more of hydroxypropyl methylcellulose, gelatin, carrageenan, gum arabic, carboxymethyl cellulose, methyl cellulose, hydroxypropyl cellulose, locust bean gum, guar gum, pectin, xanthan, starch, maltodextrin, gum ghatti, gum karaya, gum tragacanth, dextran, konjac flour, aribinogalactan, gellan gum, agar-agar, furcellaran, and alginate.

19. A confectionery produced according to the method of claim 1.

20. The confectionery according to claim 19, wherein a water activity varies by no more than ±0.05 over six months storage at room temperature.

21. The confectionery according to claim 20, wherein the water activity varies by no more than ±0.02 over six months storage at room temperature.

22. The confectionery according to claim 19 having a water activity of less than about 0.6.

23. The confectionery product according to claim 22, wherein the water activity is between about 0.4 and about 0.6.

24. The confectionery of claim 19, having a fat content of less than 20%.

25. The confectionery of claim 19, having a fat content of less than 15%.

26. A method of making a confectionery, comprising: heating a syrup comprising water, a sugar, and a humectant; adding a component containing fat to the heated syrup; adding an emulsifier to the heated syrup; and mixing the syrup with added fat component and hydrocolloid, wherein the amount of emulsifier added results in a water activity of the final confectionery of below 0.6, and wherein the final solids content is about 80 to 90% total solids by weight.

27. The method of claim 26, wherein lecithin is added as the emulsifier.

28. The method of claim 26, wherein the component containing fat comprises one or more of milk powder, milkfat, reduced-fat cocoa powder, a fat replacer, cocoa powder, vegetable fat, cocoa butter alternative, and cocoa butter.

29. The method of claim 28, wherein the component comprising fat comprises cocoa butter.

30. The method of claim 26, wherein the humectant comprises glycerol and sorbitol.

31. The method of claim 26, wherein the component containing fat comprises one or more of dark chocolate, milk chocolate, bittersweet chocolate, semisweet chocolate, white chocolate, chocolate liquor, and peanut butter.

32. The method of claim 26, wherein the component containing fat further comprises protein.

33. The method of claim 26, wherein the water activity of the final confectionery is between 0.4 and 0.6.

34. The method of claim 26, wherein the moisture content of the final confectionery is between about 5 to about 15% by weight.

35. The method of claim 26, wherein the moisture content of the heated syrup is between about 5 to about 25% by weight.

36. The method of claim 26, wherein the fat content of the final confectionery is between about 5 to about 15% by weight.

37. The method of claim 26, wherein the fat content of the final confectionery is between about 5 to about 40% by weight.

38. The method of claim 26, wherein the fat content of the final confectionery is between about 5 to about 7% by weight.

39. The confectionery according to claim 38, having a calcium content of about 1 to about 15%.

40. The method of claim 26, further comprising adding calcium.

41. The method of claim 40, wherein the calcium is in the form of calcium carbonate.

42. The method of claim 41, wherein calcium carbonate is added to result in a final concentration of about 1 to about 10% by weight.

43. The method of claim 42, wherein the final concentration of calcium carbonate is about 5 to about 8% by weight.

44. The method of claim 26, wherein the emulsifier is one or more of hydroxylated lecithin, polyglycerol ester, and distilled monoglyceride.

45. A method of making a confectionery, comprising: forming a first component by: combining water, at least one humectant, sugar, and at least one corn syrup to form a first syrup mixture; heating the first syrup mixture to above 170° F.; adding a hydrocolloid or emulsifier to the heated first syrup mixture; and continuing to heat the first syrup mixture until a solids content of about 80–90 wt. % is obtained; forming a second component by combining a fat and a flavoring; and mixing the first component and the second component at a temperature above the melting point of the fat to form a second mixture.

46. The method according to claim 45, wherein the hydrocolloid is selected from the group consisting of hydroxypropyl methylcellulose, gelatin, carrageenan, gum arabic, carboxymethyl cellulose, methyl cellulose, hydroxypropyl cellulose, locust bean gum, guar gum, pectin, xanthan, starch, maltodextrin, gum ghatti, gum karaya, gum tragacanth, dextran, konjac flour, aribinogalactan, gellan gum, agar-agar, furcellaran, and alginate.

47. The method according to claim 45, wherein the hydrocolloid is carrageenen.

48. The method according to claim 45, wherein the at least one humectant is glycerol, sorbitol, mannitol, xylitol, maltitol, hydrogenated starch hydrolysate, lactitol, isomalt, and erythritol.

49. The method according to claim 45, further comprising milling the second component to an average particle size below 50 microns prior to the mixing step.

50. The method according to claim 45, wherein the fat is an animal fat, a milkfat, or a vegetable fat.

51. The method according to claim 45, wherein the second component comprises a fat replacer or cocoa butter.

52. The method according to claim 45, wherein the second component comprises at least one of dark chocolate, milk chocolate, bittersweet chocolate, semisweet chocolate, white chocolate, chocolate liquor, or peanut butter.

53. The method according to claim 45, wherein the second component further comprises a protein.

54. The method according to claim 53, wherein the protein is milk protein or soy protein.

55. The method according to claim 45, wherein the second component comprises chocolate or confectionery peanut butter.

56. The method according to claim 45, wherein a ratio of the first component to the second component is about 40:60 to about 60:40.

57. The method according to claim 56, wherein the ratio is about 48:52 to about 52:48.

58. The method according to claim 45, wherein the emulsifier is one or more of lecithin, hydroxylated lecithin, polyglycerol ester, and distilled monoglyceride.

59. The method according to 58, wherein the emulsifier is lecithin.

60. A confectionery produced according to the method of claim 45.

61. The confectionery according to claim 60, wherein a water activity varies by no more than ±0.05 over six months storage at room temperature.

62. The confectionery according to claim 60, wherein the water activity varies by no more than ±0.02 over six months storage at room temperature.

63. The confectionery according to claim 60, having a water activity of less than about 0.6.

64. The confectionery product according to claim 63, wherein the water activity is between about 0.4 and about 0.6.

65. The confectionery according to claim 60, having a calcium content of about 1 to about 15%.

66. The confectionery of claim 60, having a fat content below 20%.

67. The confectionery of claim 60, having a fat content below 15%.

68. A product comprising a confectionery or confectionery ingredient comprising about 5 to about 10 wt. % water as added water, about 0.3 to about 0.5 wt. % of a hydrocolloid, about 10 to about 20 wt. % sucrose, about 10 to about 20 wt. % dextrose, about 2 to about 5 wt. % sorbitol syrup, about 10 to about 15 wt. % glycerine, about 25 to about 35 wt. % high maltose corn syrup, about 0.1 to about 0.2 wt. % of an emulsifier, about 1 to about 15 wt. % calcium carbonate, and about 1 wt. % salt, wherein the confectionery or confectionery ingredient displays less than ±0.05 change in the water activity level after room temperature storage for at least six months.

69. The product of claim 68, wherein the hydrocolloid is a carrageenan.

70. The product of claim 68, wherein the emulsifier is a lecithin, hydroxylated lecithin, or fractionated lecithin.

71. The product of claim 68, wherein the initial water activity is between about 0.4 to about 0.6.

72. The product of claim 68, wherein calcium carbonate is present at about 6 to about 9 wt. %.

73. The product of claim 68, wherein added water is present at about 8 to about 10 wt. %.

74. The product of claim 68, wherein sucrose is present at about 15 to about 20 wt. %.

75. The product of claim 68, wherein sorbitol syrup and glycerine combined are present at about 15 to about 20 wt. %.

76. The product of claim 68, wherein high maltose corn syrup is present at about 25 to about 30 wt. %.

77. The product of claim 69, wherein the hydrocolloid is present at about 0.4 wt. %.

78. The product of claim 70, wherein the emulsifier is present at about 0.11 to about 0.14 wt. %.

79. The product of claim 68, comprising a fat reducer or modified fat.

80. The product of claim 68, comprising cocoa.

* * * * *